United States Patent
Matsunaga et al.

(10) Patent No.: US 9,772,795 B2
(45) Date of Patent: Sep. 26, 2017

(54) PROCESSING APPARATUS TO RECOGNIZE PERIPHERAL COMPONENT INTERCONNECT EXPRESS DEVICES DURING BOOTUP

(71) Applicant: CANON KABUSHIKI KAISHA, Tokyo (JP)

(72) Inventors: Daisuke Matsunaga, Yokohama (JP); Yoshikazu Sato, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 14/823,764

(22) Filed: Aug. 11, 2015

(65) Prior Publication Data

US 2016/0048192 A1 Feb. 18, 2016

(30) Foreign Application Priority Data

Aug. 18, 2014 (JP) .................. 2014-165889

(51) Int. Cl.
| | | |
|---|---|---|
| G06F 1/00 | (2006.01) | |
| G06F 3/06 | (2006.01) | |
| G06F 13/38 | (2006.01) | |
| G06F 1/26 | (2006.01) | |

(52) U.S. Cl.
CPC ............ *G06F 3/0655* (2013.01); *G06F 1/266* (2013.01); *G06F 3/0625* (2013.01); *G06F 3/0679* (2013.01); *G06F 13/38* (2013.01)

(58) Field of Classification Search
None
See application file for complete search history.

(56) References Cited

FOREIGN PATENT DOCUMENTS

JP  2003-15777 A  1/2003

OTHER PUBLICATIONS

Sakai Akihira, "Configuration Device", Jan. 17, 2003—Machine translation of Japanese application publication JP2003-15777.*

* cited by examiner

*Primary Examiner* — Nitin Patel
(74) *Attorney, Agent, or Firm* — Canon U.S.A., Inc. IP Division

(57) ABSTRACT

An information processing apparatus performs data processing and includes a first device, a second device, and a power source unit to supply predetermined power. The first device includes a first communication unit that communicates with the second device, a first initialization unit that initializes the first communication unit with the supplied power based on a notification received from a second communication unit of the second device, a detection unit that detects the second device, and a transmission unit that transmits specific logical information to the detected second device. The second device stores the acquired specific logical information and includes a second initialization unit that initializes the second communication unit with the supplied predetermined power, and a third initialization unit that completes an initial setting of the second device by writing the specific logical information into storage based on the notification from the initialized second communication unit.

12 Claims, 8 Drawing Sheets

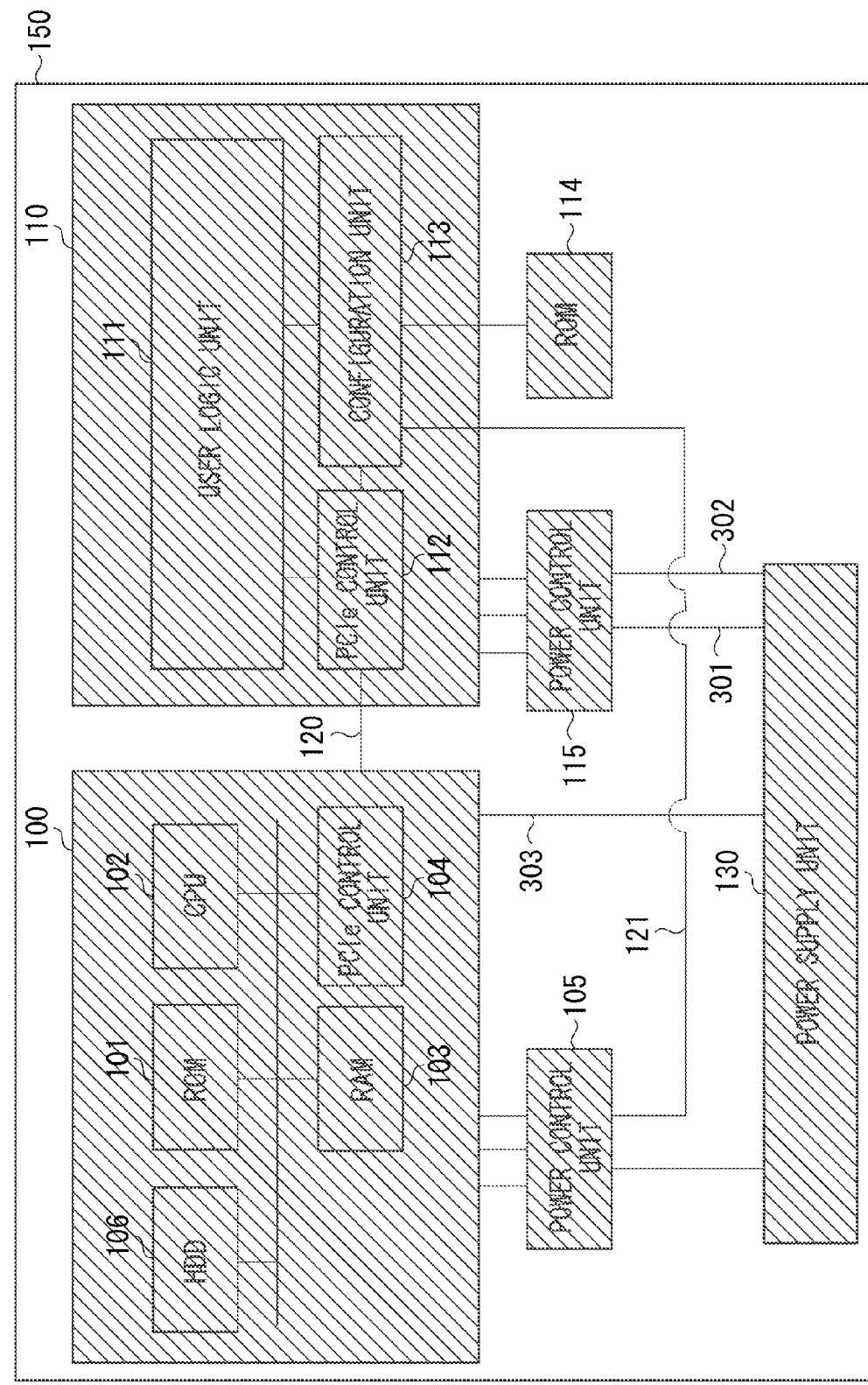

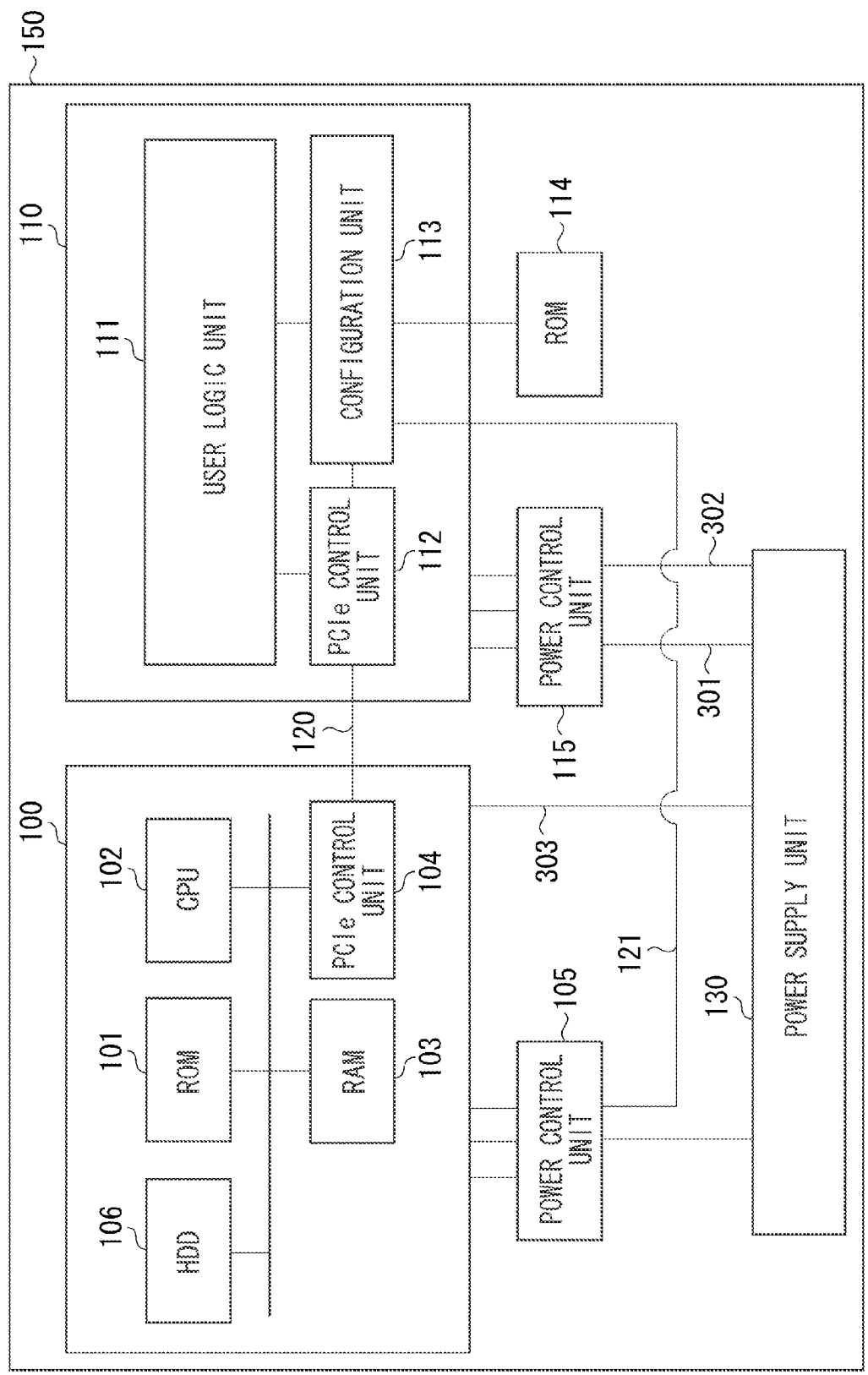

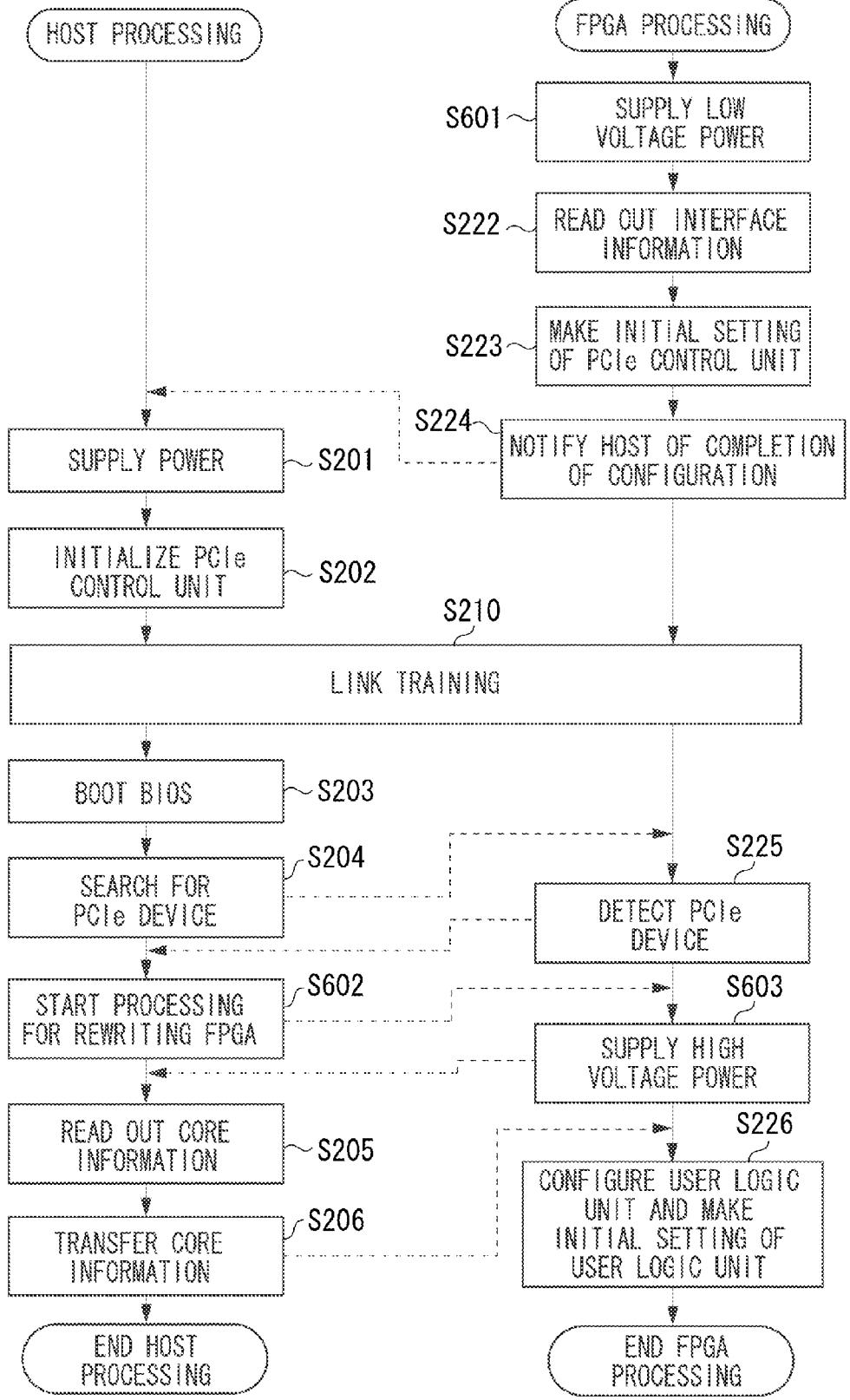

PROCESSING APPARATUS TO RECOGNIZE PERIPHERAL COMPONENT INTERCONNECT EXPRESS DEVICES DURING BOOTUP

BACKGROUND OF THE INVENTION

Field of the Invention

The present invention relates to an information processing apparatus, and a method for controlling power of an information processing apparatus.

Description of the Related Art

Conventionally, an information processing apparatus is provided with an integrated circuit that can be configured to be set by a consumer or a designer after being manufactured, and performs image processing or the like while reconfiguring a logical configuration for dynamically processing a requested job (configuration). One example of such an integrated circuit is a field-programmable gate array (FPGA). There is a technique that connects a programmable logic device (PLD), which controls the FPGA configuration, and a microcomputer to each other via a control line to ensure that the microcomputer can access this FPGA after completion of the configuration.

According to Japanese Patent Application Laid-Open No. 2003-15777, the PLD notifies the microcomputer of the completion of the FPGA configuration via the control line, which allows the microcomputer to recognize a timing at which the FPGA becomes accessible. This mechanism can contribute to a stable and quick start-up of a configuration apparatus system, and improvement in a system performance thereof.

This technique can be also applied in a case where, for example, the FPGA is connected to a host central processing unit (CPU) via a bus such as a Peripheral Component Interconnect Express (PCIe) bus, and the host CPU recognizes the FPGA as a PCIe device. More specifically, the host CPU can reliably detect the FPGA as the PCIe device by being notified of the completion of the configuration of the FPGA including a PCIe control unit, which corresponds to an end point. The host CPU can search for the PCIe device after this notification.

The information processing apparatus desirably reduces a boot-up time taken after the information processing apparatus is powered on.

There is a method that refrains from configuring an entire logic of the FPGA during a sequence of booting up a system, and postpones the configuring until later processing, because this processing takes a time of approximately several hundred microseconds.

For example, the information processing apparatus can reduce the time taken to boot up the entire system if the configuring of the FPGA is carried out in an idle state after the boot-up processing, or immediately before carrying out the FPGA function.

However, in the system that uses the FPGA while causing the host CPU to recognize the FPGA as the PCIe device, at least the configuration of the PCIe control unit of the FPGA should be completed before the host CPU searches for the PCIe device.

Generally, the host CPU searches for the PCIe device while a Basic Input/Output System (BIOS) or the like is being booted up, whereby the method that configures the entire FPGA after the boot-up as described above does not allow the host CPU to recognize the FPGA as the PCIe device.

SUMMARY OF THE INVENTION

The present invention is directed to providing a mechanism that allows the host CPU to recognize the FPGA as the PCIe device at the time of the boot-up while reducing the time taken to boot up the system.

An information processing apparatus according to an aspect of the present invention includes the following configuration.

According to the aspect of the present invention, an information processing apparatus configured to perform data processing by a first device and a second device includes a power source unit configured to supply predetermined power to the first device and the second device, wherein the first device includes a first communication unit configured to communicate with the second device, a first initialization unit configured to initialize the first communication unit with the power supplied from the power source unit based on reception of a notification from a second communication unit of the second device, a detection unit configured to detect the second device with communication established between the initialized first communication unit and the second communication unit of the second device, and a transmission unit configured to transmit specific logical information to the detected second device with use of the first communication unit, and wherein the second device includes the second communication unit configured to communicate with the first device, a storage unit configured to store the specific logical information acquired from the first device, a second initialization unit configured to initialize the second communication unit with the predetermined power supplied from the power source unit, and a third initialization unit configured to complete an initial setting of the second device by writing the specific logical information acquired from the first device into the storage unit with the communication established between the first communication unit to be initialized and the second communication unit, based on the notification from the initialized second communication unit.

Further features of the present invention will become apparent from the following description of exemplary embodiments with reference to the attached drawings.

BRIEF DESCRIPTION OF THE DRAWINGS

FIGS. 5A, 5B, and 5C illustrate states of power supply to each block in the information processing apparatus.

FIGS. 6A and 6B are flowcharts illustrating a method for controlling the information processing apparatus.

DESCRIPTION OF THE EMBODIMENTS

Next, exemplary embodiments for embodying the present invention will be described with reference to the drawings.

Figure 1:
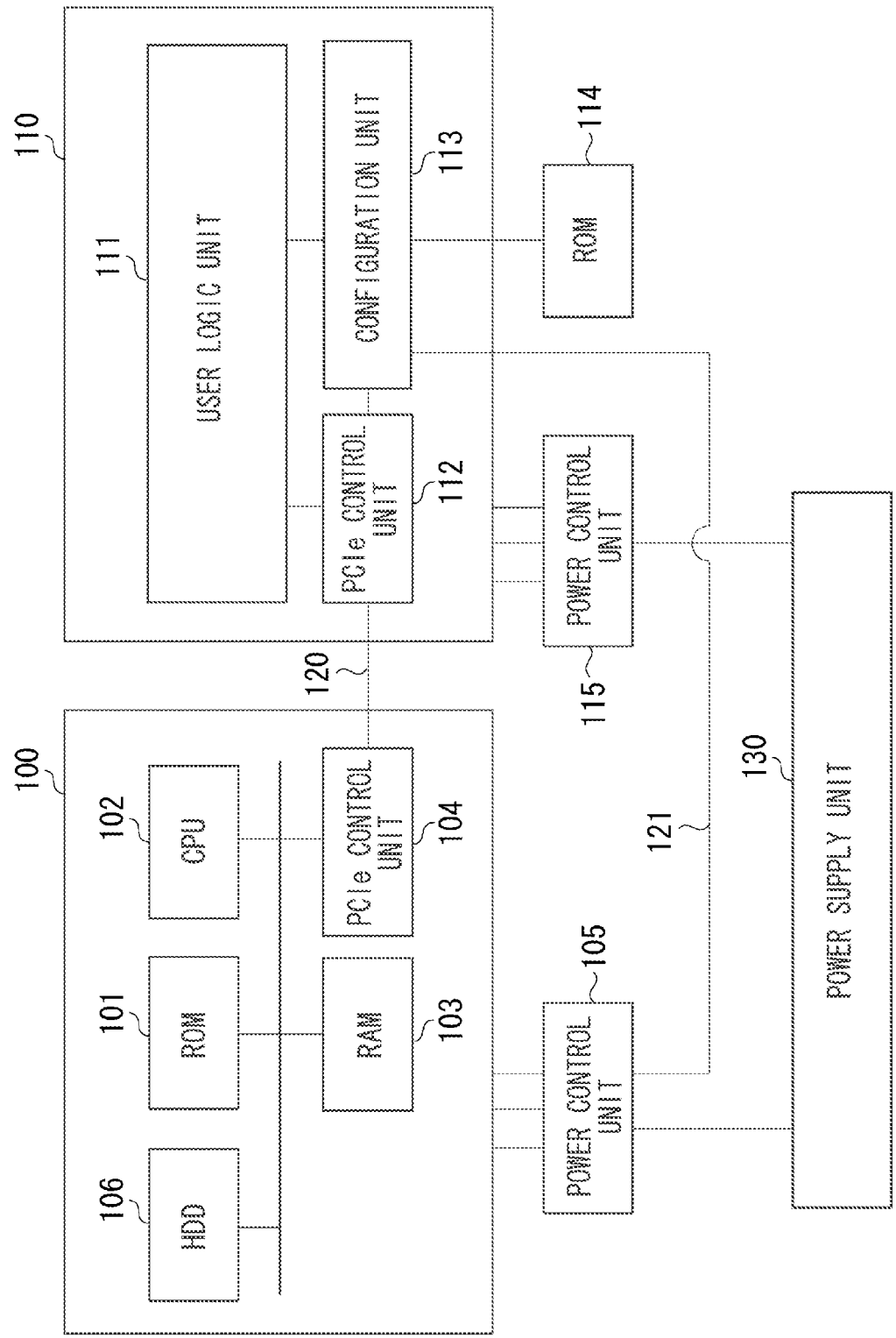
FIG. 1 is a block diagram illustrating a configuration of an information processing apparatus.

Now, a first exemplary embodiment will be described. FIG. 1 is a block diagram illustrating a configuration of an information processing apparatus according to the present exemplary embodiment. Functions carried out by the information processing apparatus include, for example, an image processing function, a print function, a scanner function, a data transmission function, and the like. The information processing apparatus including an image processing apparatus, an image forming apparatus, and a multifunction image forming apparatus receives a job from a not-illustrated host computer, and performs data processing based on the image processing function, the print function, the scanner function, or the data transmission function. Further, in the following description, processing for booting a first device and a second device will be described in detail together with a timing of supplied power. A host 100 including a CPU is the first device, and an FPGA serving as a PCIe device is the second device.

Referring to FIG. 1, the host 100 includes a read only memory (ROM) 101, a CPU 102, a random access memory (RAM) 103, a PCIe control unit 104, and a hard disk drive (HDD) 106. The ROM 101 stores a boot program (a BIOS), an operating system (OS), and an application program. When power is supplied from a power control unit 105 to the host 100, the CPU 102 reads out the boot program from the ROM 101, and starts an operation. The PCIe control unit 104 can transmit specific logical information to a PCIe control unit 112 by establishing predetermined communication with the PCIe control unit 112 of an FPGA 110, which will be described below. The specific logical information corresponds to a logical configuration to be written into a user logic unit 111, which will be described below, and allows the FPGA 110 to be dynamically reconfigured according to processing of a job to be carried out by the FPGA 110.

The RAM 103 temporarily stores data when the CPU 102 executes a program, and data read out from the HDD 106. The HDD 106 stores data to be processed on the program that runs on the CPU 102. The HDD 106, which is a nonvolatile memory, stores logical configuration data that should be written into the FPGA 110.

The PCIe control unit 104 is connected to the PCIe control unit 112 of the FPGA 110 via a PCIe bus 120, and provides/receives data to/from the FPGA 110. When power is supplied from the power control unit 105 to the host 100, the PCIe control unit 104 is placed into a state where a physical connection can be confirmed by link training without the CPU 102 intervening therein. The power control unit 105 converts direct-current (DC) power supplied from a power supply unit 130 into an appropriate voltage, and supplies the converted power to the host 100.

The FPGA 110 includes the user logic unit 111, the PCIe control unit 112, and a configuration unit 113. The user logic unit 111 is a circuit unit rewritable by the configuration unit 113, and a storage area divided into a plurality of areas is prepared for the user logic unit 111. Then, the logical configuration data is written into each of the storage areas when the PCIe control unit 112 receives the logical configuration data transmitted from the PCIe control unit 104 under control that will be described below, so that a programmable logical circuit corresponding to a requested job is configured. The PCIe control unit 112 is connected to the PCIe control unit 104 of the host 100 via the PCIe bus 120, and provides/receives data to/from the host 100. In a case where the PCIe control unit 112 is a hard macro of the FPGA 110, the configuration unit 113 should have completed an initial setting of the PCIe control unit 112 to place the PCIe control unit 112 into the state where a physical connection can be confirmed by the link training.

The configuration unit 113 configures the user logic unit 111 and the PCIe control unit 112, and makes the initial setting of the user logic unit 111 and the PCIe control unit 112 according to information stored in a ROM 114 upon power supply from a power control unit 115. Further, the configuration unit 113 can also configure the user logic unit 111 and make the initial setting of the user logic unit 111 according to the information transmitted from the host 100 via the PCIe control unit 112.

However, the configuration unit 113 cannot perform this configuration method until the configuration unit 113 completes the configuration and initial setting of the PCIe control unit 112, and the FPGA 110 is detected (recognized) as the PCIe device by the CPU 102 of the host 100.

A content of this configuration processing performed by the configuration unit 113 largely affects power consumption and a configuration time of the FPGA 110. More specifically, for example, when the processing performed by the configuration unit 113 includes only the initial setting the PCIe control unit 112, this processing can be completed with low power consumption and a short configuration time.

However, when the configuration unit 113 configures the user logic unit 111 and makes the initial setting of the user logic unit 111, this configuration (rewriting the RAM) consumes high power and takes a long configuration time because the user logic unit 111 generally occupies most of the FPGA 110.

Further, upon completing the configuration based on the information read in from the ROM 114, the configuration unit 113 notifies the power control unit 105 on the host 100 side of this completion via a signal line 121. Due to this signal line 121, the power control unit 105 on the host 100 side is configured to supply the power to the host 100 after the completion of the configuration of the FPGA 110 from the ROM 114.

In the present exemplary embodiment, it is assumed that the ROM 114 stores only initial setting information of the PCIe control unit 112 (hereinafter referred to as interface information). Further, it is assumed that configuration information and initial setting information of the user logic unit 111 are stored in the HDD 106 on the host 100 side (hereinafter referred to as core information). The power control unit 115 converts DC power supplied from the power supply unit 130 into an appropriate voltage, and then supplies the converted power to the FPGA 110.

Figure 2:
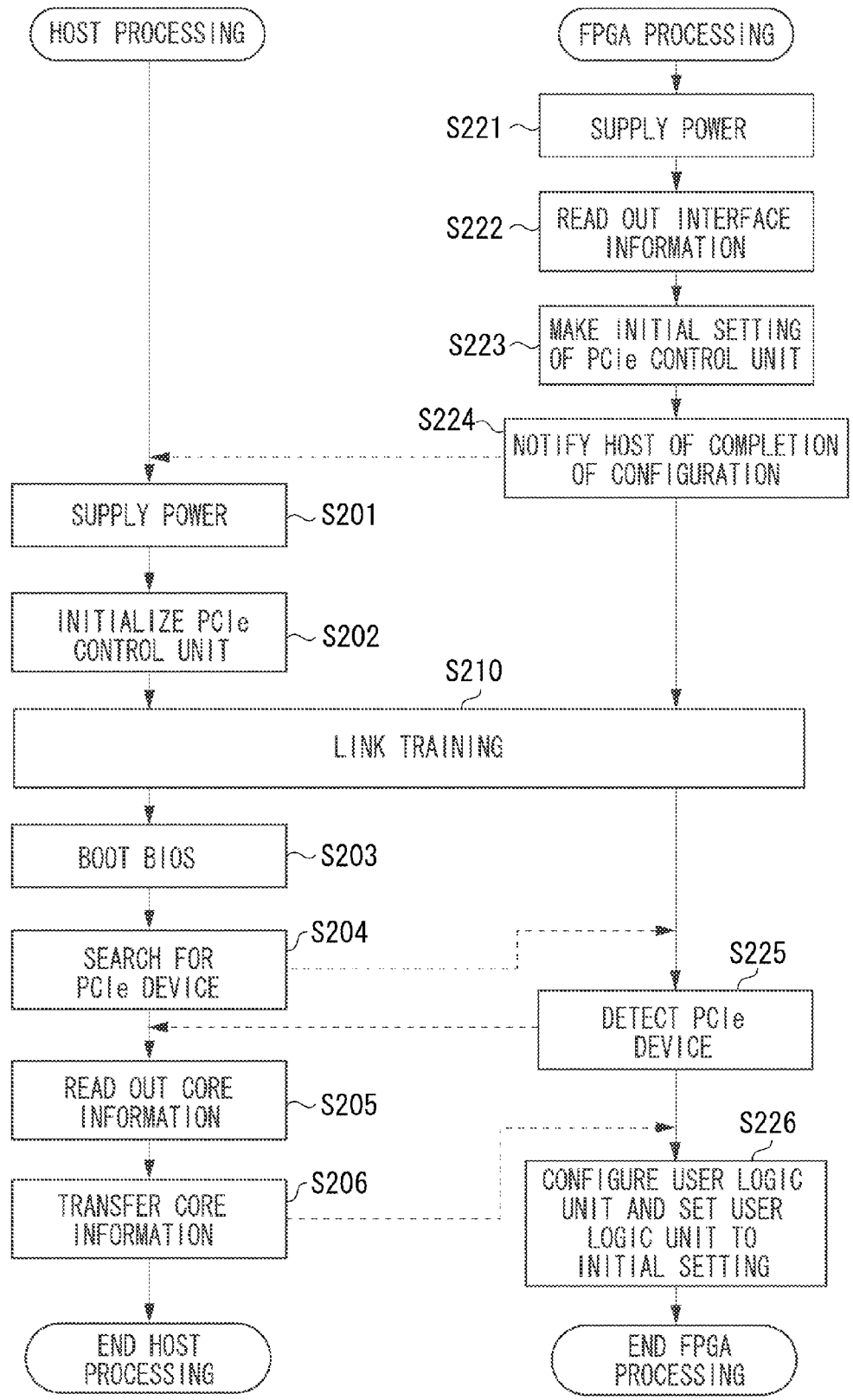
FIGS. 2A and 2B are flowcharts illustrating a method for controlling the information processing apparatus.

FIGS. 2A and 2B are flowcharts illustrating a method for controlling the information processing apparatus according to the present exemplary embodiment. This example is one example of a flow of configuration of the FPGA 110 illustrated in FIG. 1. The CPU 102 executes a control program stored in the ROM 101, which realizes a part of steps illustrated in FIG. 2A.

First, in step S221, when a not-illustrated system power source is turned on, the power control unit 115 on the FPGA 110 side starts supplying the power to the FPGA 110. Then, in step S222, the configuration unit 113 reads out the interface information from the ROM 114. In step S223, the configuration unit 113 makes the initial setting of the PCIe control unit 112. Then, in step S224, upon completing the initial setting of the PCIe control unit 112, the configuration unit 113 notifies the power control unit 105 of the host 100 that the configuration is completed with use of the signal line 121. At this time, the PCIe control unit 112 is placed into the state where a physical connection can be confirmed by the link training.

On the other hand, in step S201, upon receiving the notification from the configuration unit 113, the power control unit 105 of the host 100 starts supplying power to the host 100. Then, in step S202, the PCIe control unit 104 is initialized into the state where a physical connection can be confirmed by the link training without the CPU 102 intervening therein, as described above. Then, in step S210, the PCIe control unit 112 and the PCIe control unit 104 carry out the link training toward each other to establish a physical connection therebetween. Namely, the link training starts based on the completion of the initialization of the PCIe control unit 112 of the FPGA 110 and the completion of the initialization of the PCIe control unit 104 of the host 100.

After that, in step S203, the CPU 102 reads out the BIOS from the ROM 101, and starts booting the host 100. During processing in step S204, the CPU 102 searches for a device connected on the other side of the PCIe bus 120 via the PCIe control unit 104. If the PCIe control unit 112 determines that the link training of each other has been normally completed in step S210, in step S225, the PCIe control unit 112 on the FPGA 110 side is detected on the host 100 side as the PCIe device by responding to a request from the PCIe control unit 104 on the host 100 side.

For example, the PCIe control unit 112 transmits a vender identification (ID) and a device ID set to the initial setting in step S223 to the host 100 in response to a request to transmit the vender ID and the device ID from the host 100. This flow allows the host 100 to correctly recognize the FPGA 110 as the PCIe device.

After recognizing the FPGA 110 as the PCIe device, in step S205, the CPU 102 of the host 100 reads out the core information stored in the HDD 106. Then, in step S206, the CPU 102 transfers the read core information to the PCIe control unit 112 of the FPGA 110 via the PCIe control unit 104 and the PCIe bus 120.

The core information transferred from the PCIe control unit 104 to the PCIe control unit 112 is directly transferred to the configuration unit 113. Then, in step S226, the configuration unit 113 configures the user logic unit 111 and makes the initial setting of the user logic unit 111 based on this core information.

The information processing apparatus is adapted not to perform configuration of the PCIe control unit 112 or make the initial setting of the PCIe control unit 112 at this time, so that the user logic unit 111 can be rewritten from the host 100 without the PCIe control unit 112 disconnecting the link with the PCIe control unit 104.

According to the above-described exemplary embodiment, the information processing apparatus can complete the configuration in a short period of time by arranging only the initial setting of the PCIe control unit 112 with use of the interface information stored in the ROM 114 when booting up the system.

Further, according to the above-described exemplary embodiment, the PCIe control unit 112 of the FPGA 110 and the PCIe control unit 104 of the host 100 can complete the link training before the CPU 102 searches for the PCIe device.

According to this mechanism, the CPU 102 can detect the FPGA 110 as the PCIe device at the time of the processing for searching for the PCIe device that is performed by the CPU 102 of the host 100.

Further, the information processing apparatus can rewrite the user logic unit 111 into a target circuit configuration without disconnecting the connection between the host 100 and the FPGA 110 via the PCIe bus 120 by configuring the user logic unit 111 with use of the core information after the host 100 detects the FPGA 110 as the PCIe device.

Now, a second exemplary embodiment will be described. In the first exemplary embodiment, the FPGA 110 has three types of power states as illustrated in FIG. 3.

Figure 3:
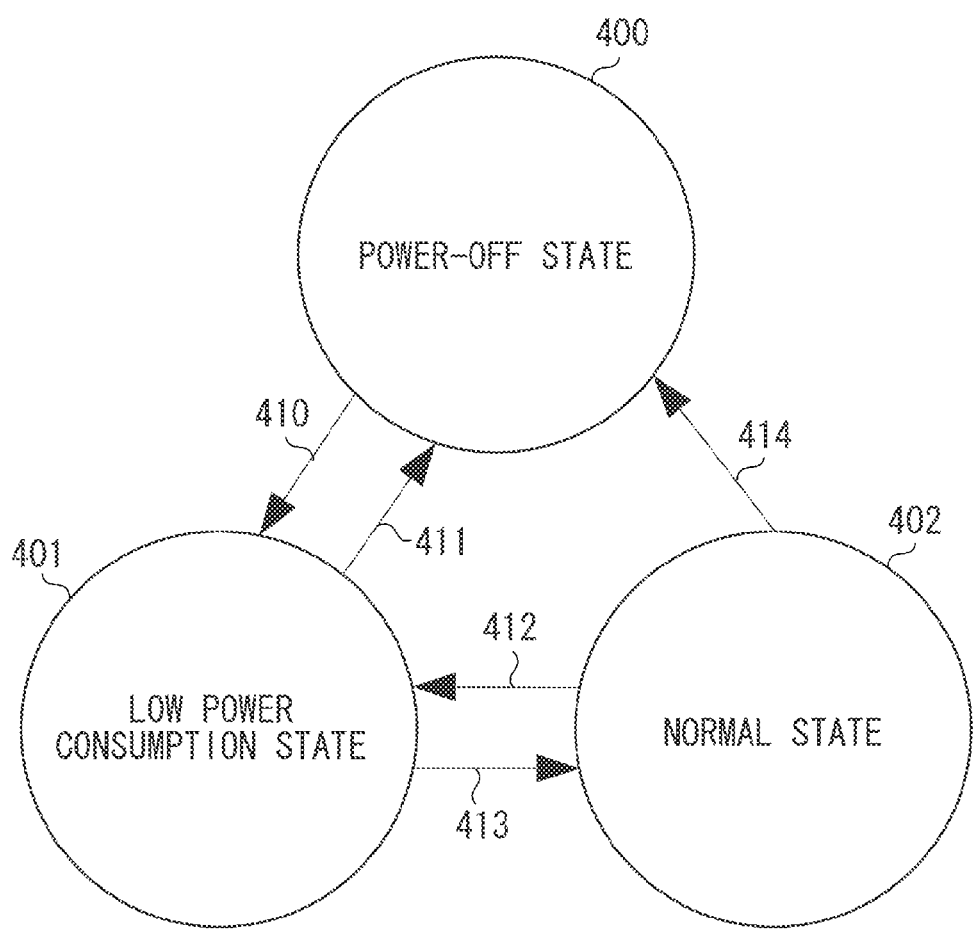
FIG. 3 illustrates power supply states of the information processing apparatus.

Referring to FIG. 3, a first power state is a power-off state 400 in which the power control unit 115 does not supply power to the FPGA 110. At this time, power consumed by the FPGA 110 is zero. A second power state is a low power consumption state 401 in which the power control unit 115 supplies power to the FPGA 110, and only the PCIe control unit 112 and the configuration unit 113 are operable while a clock signal is not supplied to the user logic unit 111.

A third power state is a normal state 402 in which the power control unit 115 supplies power to the FPGA 110, and the user logic unit 111 is also operable in addition to the PCIe control unit 112 and the configuration unit 113. At this time, the power consumed by the FPGA 110 increases in operation.

The power state of the FPGA 110 transitions among these power states as indicated by arrows illustrated in FIG. 3. For example, in a sequence of the FPGA processing illustrated in FIG. 2, the FPGA 110 is maintained in the power-off state 400 until immediately before step S221. When the power supply starts in step S221, the FPGA 110 transitions into the low power consumption state 401 (410). The FPGA 110 is maintained in the low power consumption state 401 from step S221 until immediately before step S226.

When the user logic unit 111 is configured in step S226, the FPGA 110 transitions into the normal state 402 (413). After step S226, the FPGA 110 is maintained in the normal state 402. Further, the FPGA 110 transitions into the power-off state 400 (414) if the power supply from the power supply unit 130 stops when the FPGA 110 is in the normal state 402, although this is not included in the flowchart illustrated in FIG. 2. Further, there are also a transition from the normal state 402 to the low power consumption state 401 (412), and a transition from the low power consumption state 401 to the power-off state 400 (411).

More specifically, the power control unit 115 includes a DC/DC converter that converts the voltage supplied from the power supply unit 130 into a plurality of voltages to be used by the FPGA 110.

In the above-described third power state, the power consumed by the FPGA 110 is high in operation, and the FPGA 110 is largely affected by a voltage drop if the power supply unit 130 supplies power to the FPGA 110 at a low voltage.

On the other hand, in the above-described second power state, the FPGA 110 is in operation in the low power consumption state 401, and, if the power supply unit 130 supplies power to the FPGA 110 at a high voltage, efficiency of the conversion by the DC/DC converter of the power control unit 115, i.e., power efficiency, is lowered.

Figure 4:
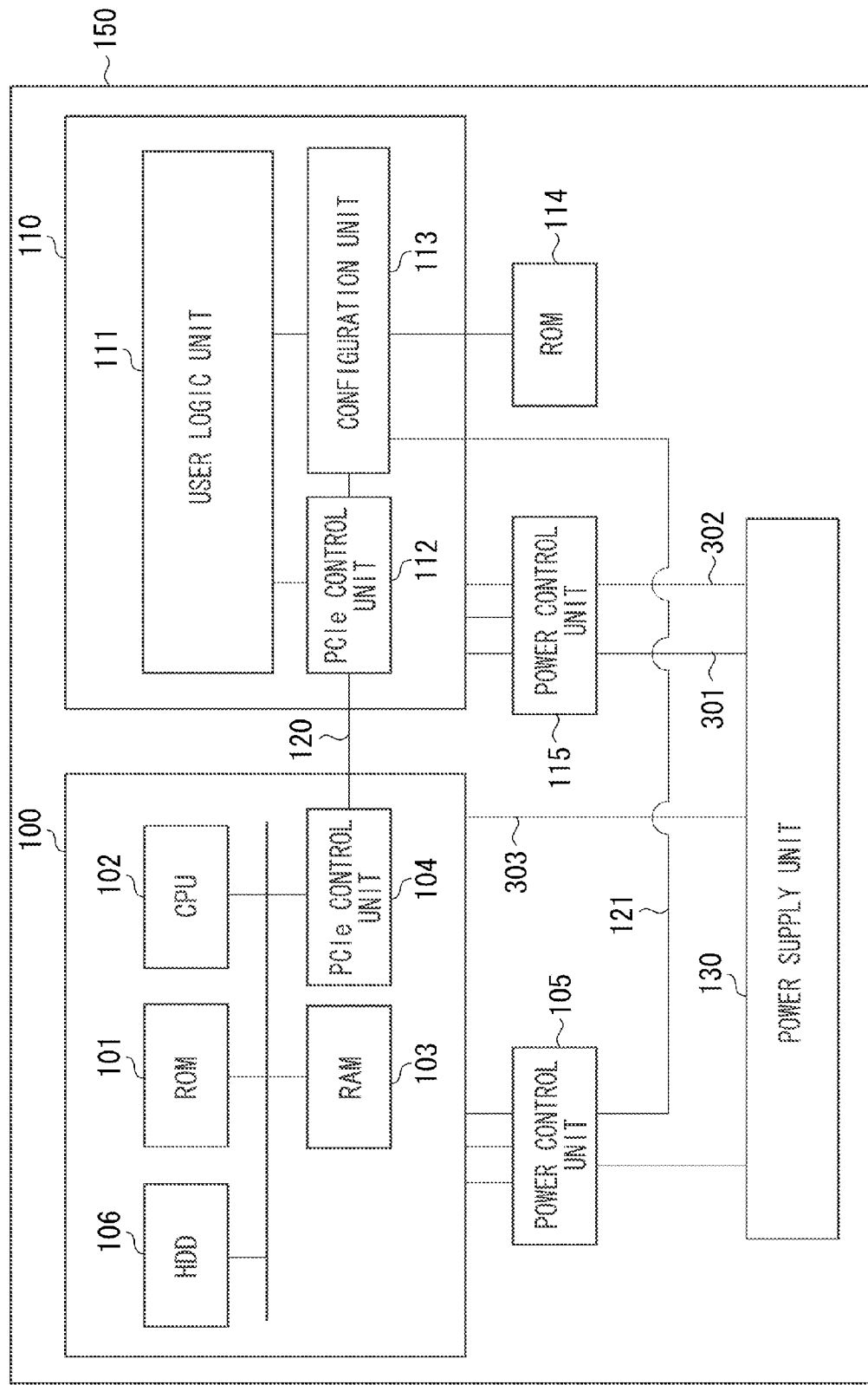
FIG. 4 is a block diagram illustrating a configuration of an information processing apparatus.

Therefore, in the second exemplary embodiment, a voltage system supplied from the power supply unit 130 to the power control unit 115 is divided into two systems, a high voltage system having a high power capacity and a low voltage system having a low power capacity, as illustrated in FIG. 4, to solve the above-described problem.

Then, the second exemplary embodiment can reduce the voltage drop in the normal state 402 and improve the power efficiency in the low power consumption state 401 by supplying these power source systems while switching them according to each of the power states illustrated in FIG. 3. Now, a configuration of the second exemplary embodiment will be described in detail.

FIG. 4 is a block diagram illustrating a configuration of an information processing apparatus according to the present exemplary embodiment. In the following description, a difference from the configuration of the first exemplary embodiment illustrated in FIG. 1 will be described.

Referring to FIG. 4, two systems, i.e., a low voltage system 301 and a high voltage system 302, are supplied from the power supply unit 130 to the power control unit 115. The host 100 includes a control line 303 for controlling the power supply unit 130, and can control switching of a state of power supply to the FPGA 110 by controlling the power supply unit 130 from the CPU 102 or the like.

Figure 5B:
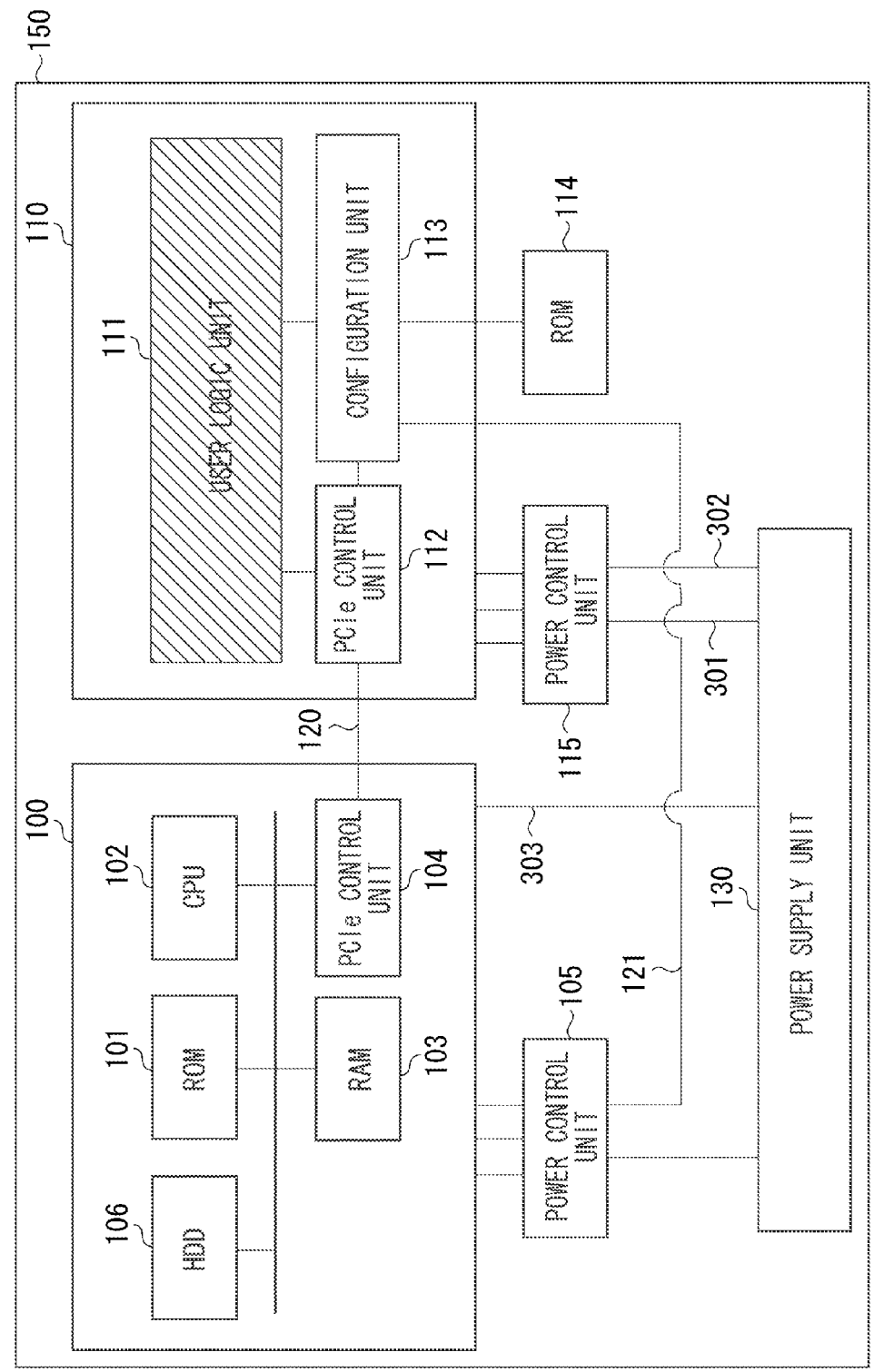

FIGS. 5A, 5B, and 5C illustrate states of power supply to each of the blocks in the information processing apparatus illustrated in FIG. 4. Now, a transition of the state of power supply to each of the blocks illustrated in FIG. 4 will be described in comparison with each of the power states illustrated in FIG. 3.

FIGS. 5A, 5B, and 5C illustrate operable blocks when the power state is the power-off state 400, the low power consumption state 401, and the normal state 402, respectively. A hatched portion indicates a disabled block.

In the power supply state illustrated in FIG. 5A, which corresponds to the power-off state 400, no power is supplied to all of the internal blocks of the information processing apparatus 150, and the information processing apparatus 150 is disabled.

Further, in the power supply state illustrated in FIG. 5B, which corresponds to the low power consumption state 401, only the user logic unit 111 of the FPGA 110 is inoperable while the other blocks are operable. In the power supply state illustrated in FIG. 5C, which corresponds to the normal state 402, all of the blocks included in the information processing apparatus 150 are operable.

FIGS. 6A and 6B are flowcharts each illustrating a method for controlling the information processing apparatus according to the present exemplary embodiment. This is one example of a flow of configuring the FPGA 110 illustrated in FIG. 4. The CPU 102 executes a control program stored in the ROM 101, which realizes a part of steps illustrated in FIG. 6A. Further, the FPGA 110 executes a program stored in the ROM 114, which realizes each of steps illustrated in FIG. 6B. In the following description, a difference from FIGS. 2A and 2B will be described.

In step S601, the power supply unit 130 supplies the low voltage system 301 to the power control unit 115. Upon the supply of the low voltage system 301 from the power control unit 115, in step S222, the FPGA 110 starts reading out the interface information from the ROM 114. After that, the host 100 detects the FPGA 110 as the PCIe device according to a similar flow to FIG. 2 until step S225.

After that, in step S602, the host 100 starts the processing for rewriting the FPGA 110 when the processing by the FPGA 110 becomes necessary.

During this processing, in step S603, the CPU 102 of the host 100 instructs the power supply unit 130 to supply through the high voltage system 302 via the control line 303, and the power supply unit 130 supplies through the high voltage system 302 to the power control unit 115 according to this instruction. Upon receiving the supply of the high voltage system 302, the power control unit 115 starts supplying a voltage generated by converting an input voltage of the high voltage system 302 with use of the DC/DC converter to the FPGA 110 while prioritizing the high voltage system 302 over the already supplied low voltage system 301.

After that, the host 100 reads out the core information from the HDD 106, and transfers the read core information to the PCIe control unit 112 of the FPGA 110 in a similar manner to the first exemplary embodiment. Then, the FPGA 110 rewrites the user logic unit 111 into a target circuit according to the transferred core information with supplied power of the high voltage system 302 having the high power capacity.

According to the second exemplary embodiment, the information processing apparatus can reduce the voltage drop when the FPGA 110 is in the normal state 402 and improve the power efficiency when the FPGA 110 is in the low power consumption state 401 with respect to the input voltage and the output voltage of the power supply unit 130 and the power control unit 115. Further, the information processing apparatus can be prevented from excessively extracting current from the low voltage system 301 having the low power capacity, by configuring the user logic unit 111 after the high voltage system 302 having the high power capacity is input.

Each of the steps in the present invention can be also realized by executing software (a program) acquired via a network or various kinds of storage media by a processing apparatus (a CPU or a processor) such as a personal computer (a computer).

The present invention is not limited to the above-described exemplary embodiments. The present invention can be modified in various manners (including an organic combination of the individual exemplary embodiments) based on a spirit of the present invention, and such modifications are not excluded from the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the first device, which functions as the host at the time of the boot-up, can recognize the second device while the time taken to boot up the system can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-165889, filed Aug. 18, 2014, which is hereby incorporated by reference herein in its entirety.

What is claimed is:

1. An information processing apparatus configured to perform data processing by a first device and a second device, the information processing apparatus comprising:
   a power source unit configured to supply predetermined power to the first device and the second device,
   wherein the first device includes a first communication unit configured to communicate with the second device, a first initialization unit configured to initialize the first communication unit with the power supplied from the power source unit based on reception of a notification from a second communication unit of the second device, a detection unit configured to detect the second device with communication established between the initialized first communication unit and the second communication unit of the second device, and a transmission unit configured to transmit specific logical information to the detected second device with use of the first communication unit, and
   wherein the second device includes the second communication unit configured to communicate with the first device, a storage unit configured to store the specific logical information acquired from the first device, a second initialization unit configured to initialize the second communication unit with the predetermined power supplied from the power source unit, and a third initialization unit configured to complete an initial setting of the second device by writing the specific logical information acquired from the first device into the storage unit with the communication established between the first communication unit to be initialized and the second communication unit, based on the notification from the initialized second communication unit.

2. The information processing apparatus according to claim 1, wherein the first device includes a central processing unit (CPU).

3. The information processing apparatus according to claim 1, wherein the first device includes a nonvolatile memory configured to store the specific logical information to be transmitted to the second device.

4. The information processing apparatus according to claim 3, wherein the nonvolatile memory stores the specific logical information associated with a function requested by a predetermined job.

5. The information processing apparatus according to claim 1, wherein the storage unit stores the specific logical information transmitted from the first device while dividing the specific logical information among a plurality of areas in the storage unit.

6. The information processing apparatus according to claim 1, wherein the storage unit is a field-programmable gate array.

7. An information processing apparatus configured to perform data processing by a first device and a second device, the information processing apparatus comprising:
   a power source unit configured to supply first power to the second device, or supply second power with higher power consumption than the first power to the first device and the second device,
   wherein the first device includes a first communication unit configured to communicate with the second device, a first initialization unit configured to initialize the first communication unit with the second power supplied from the power source unit based on reception of a notification from a second communication unit of the second device, a detection unit configured to detect the second device with communication established between the initialized first communication unit and the second communication unit of the second device, and a transmission unit configured to transmit specific logical information to the detected second device with use of the first communication unit, and
   wherein the second device includes the second communication unit configured to communicate with the first device, a storage unit configured to store the specific logical information acquired from the first device, a second initialization unit configured to initialize the second communication unit with the first power supplied from the power source unit, and a third initialization unit configured to complete an initial setting of the second device by writing the specific logical information acquired from the first device into the storage unit, with the communication established between the first communication unit to be initialized and the second communication unit, based on the notification from the initialized second communication unit, and with the second power supplied from the power source unit.

8. The information processing apparatus according to claim 7, wherein the first device includes a central processing unit (CPU).

9. The information processing apparatus according to claim 7, wherein the first device includes a nonvolatile memory configured to store the specific logical information to be transmitted to the second device.

10. The information processing apparatus according to claim 9, wherein the nonvolatile memory stores the specific logical information associated with a function requested by a predetermined job.

11. The information processing apparatus according to claim 7, wherein the storage unit stores the specific logical information transmitted from the first device while dividing the specific logical information among a plurality of areas in the storage unit.

12. The information processing apparatus according to claim 7, wherein the storage unit is a field-programmable gate array.

* * * * *